United States Patent
Hunter et al.

(10) Patent No.: US 9,831,044 B2
(45) Date of Patent: Nov. 28, 2017

(54) DEVICES AND METHODS INCLUDING POLYACETYLENES

(71) Applicant: PolyJoule, Inc., Lincoln, MA (US)

(72) Inventors: Ian W. Hunter, Lincoln, MA (US); Timothy M. Swager, Newton, MA (US); Zhengguo Zhu, Chelmsford, MA (US)

(73) Assignee: PolyJoule, Inc., Cambridge, MA (US)

( * ) Notice: Subject to any disclaimer, the term of this patent is extended or adjusted under 35 U.S.C. 154(b) by 1187 days.

(21) Appl. No.: 13/799,152

(22) Filed: Mar. 13, 2013

(65) Prior Publication Data

US 2013/0271090 A1 Oct. 17, 2013

Related U.S. Application Data

(60) Provisional application No. 61/623,887, filed on Apr. 13, 2012.

(51) Int. Cl.
   *H01G 11/38* (2013.01)
   *H01G 11/32* (2013.01)
   *H01G 11/48* (2013.01)

(52) U.S. Cl.
   CPC ......... *H01G 11/38* (2013.01); *H01G 11/32* (2013.01); *H01G 11/48* (2013.01); *Y02E 60/13* (2013.01); *Y10T 29/417* (2015.01)

(58) Field of Classification Search
   CPC ......... H01G 11/38; H01G 11/32; H01G 11/48
   See application file for complete search history.

(56) References Cited

U.S. PATENT DOCUMENTS

| | | | | |
|---|---|---|---|---|
| 4,560,633 A | * | 12/1985 | Kobayashi | C08K 7/02 |
| | | | | 429/213 |
| 4,668,596 A | * | 5/1987 | Shacklette | H01M 4/0461 |
| | | | | 429/213 |
| 5,817,436 A | * | 10/1998 | Nishijima | H01M 4/525 |
| | | | | 429/223 |
| 5,955,215 A | | 9/1999 | Kurzweil et al. | |
| 7,623,340 B1 | * | 11/2009 | Song | B82Y 30/00 |
| | | | | 361/502 |
| 2002/0034686 A1 | * | 3/2002 | Yamakawa | H01M 4/621 |
| | | | | 429/217 |
| 2004/0115529 A1 | | 6/2004 | Nakahara et al. | |

FOREIGN PATENT DOCUMENTS

| | | |
|---|---|---|
| CN | 1500293 A | 5/2004 |
| CN | 101510596 A | 8/2009 |
| EP | 1 612 819 A2 | 1/2006 |
| JP | S58-158863 A | 9/1983 |

(Continued)

OTHER PUBLICATIONS

PCT/US2013/030738, Jul. 5, 2013, International Search Report and Written Opinion.

(Continued)

*Primary Examiner* — Jane Rhee
(74) *Attorney, Agent, or Firm* — Wolf, Greenfield & Sacks, P.C.

(57) ABSTRACT

Embodiments described herein relate to compositions, devices, and methods for storage of energy (e.g., electrical energy). In some cases, devices including polyacetylene-containing polymers are provided.

31 Claims, 4 Drawing Sheets

(56) References Cited

FOREIGN PATENT DOCUMENTS

| | | |
|---|---|---|
| JP | S62-143373 A | 6/1987 |
| JP | H01-230216 A | 9/1989 |
| JP | H01-258408 A | 10/1989 |
| JP | H04-101365 A | 4/1992 |
| JP | H11-087191 A | 3/1999 |
| JP | 2008-010682 A | 1/2008 |
| WO | WO 02/082570 A1 | 10/2002 |
| WO | WO 2012/02128 A1 | 2/2012 |

OTHER PUBLICATIONS

Caja et al. "A Rechargeable Battery Employing a Reduced Polyacetylene Anode and a Titanium Disulfide Cathode," J. Electrochem. Soc., Dec. 1984, vol. 131, No. 12, pp. 2744-2750. The year of publication is sufficiently earlier than the effective U.S. filing date and any foreign priority date so that the particular month of publication is not in issue. See MPEP 609.04(a)).

International Search Report and Written Opinion for Application No. PCT/US2013/030738, dated Jul. 5, 2013.

Ito et al. "Simultaneous Polymerization and Formation of Polyacetylene Film on the Surface of Concentrated Soluble Ziegler-Type Catalyst Solution," J. Polymer Science, 1974 (month unknown), vol. 12, pp. 11-20. The year of publication is sufficiently earlier than the effective U.S. filing date and any foreign priority date so that the particular month of publication is not in issue. See MPEP 609.04(a)).

Kaneto et al. "Electrochemistry of Polyacetylene, $(CH)_x$," J. Chem. Soc., Faraday Trans. 1, 1982 (month unknown), vol. 78, pp. 3417-3429. The year of publication is sufficiently earlier than the effective U.S. filing date and any foreign priority date so that the particular month of publication is not in issue. See MPEP 609.04(a)).

Liu et al. "Acetylenic Polymers: Syntheses, Structures, and Functions," Chem. Rev., 2009 (month unknown), vol. 109, No. 11, pp. 5799-5867. The year of publication is sufficiently earlier than the effective U.S. filing date and any foreign priority date so that the particular month of publication is not in issue. See MPEP 609.04(a)).

Macinnes et al. "Organic Batteries: Reversible n- and p-Type Electrochemical Doping of Polyacetylene, $(CH)_x$," J.C.S. Chem. Comm., 1981 (month unknown), pp. 317-319. The year of publication is sufficiently earlier than the effective U.S. filing date and any foreign priority date so that the particular month of publication is not in issue. See MPEP 609.04(a)).

Nigrey et al. "Lightweight Rechargeable Storage Batteries Using Polyacetylene, $(CH)_x$, as the Cathode-Active Material," J. Electrochem. Soc., Aug. 1981, vol. 128, No. 8, pp. 1651-1654.

Rudge et al. "A Study of the Electrochemical Properties of Conducting Polymers for Application in Electrochemical Capacitors," Electrochimica Acta, 1994 (month unknown), vol. 39, No. 2, pp. 273-287. The year of publication is sufficiently earlier than the effective U.S. filing date and any foreign priority date so that the particular month of publication is not in issue. See MPEP 609.04(a)).

Snook et al. "Conducting-polymer-based supercapacitor devices and electrodes," J. Power Sources, 2011(month unknown), vol. 196, pp. 1-12. The year of publication is sufficiently earlier than the effective U.S. filing date and any foreign priority date so that the particular month of publication is not in issue. See MPEP 609.04(a)).

International Preliminary Report on Patentability for PCT/US2013/030738, dated Oct. 23, 2014.

\* cited by examiner

DEVICES AND METHODS INCLUDING POLYACETYLENES

RELATED APPLICATIONS

This application claims priority under 35 U.S.C. §119(e) to U.S. Provisional Application Ser. No. 61/623,887, filed Apr. 13, 2012, the contents of which are incorporated herein by reference in its entirety for all purposes.

FIELD OF THE INVENTION

Devices for storage of electrical energy are described, as well as related methods.

BACKGROUND OF THE INVENTION

Supercapacitors, or electrochemical double-layer capacitors, have been shown to achieve higher power and longer cycles than other energy storage devices including batteries. Supercapacitors have the potential to be useful in a wide range of applications including automobiles (e.g., hybrid cars), electronics, and other applications requiring a power source. However, their widespread use has been limited due to the use of expensive materials and complex handling procedures in manufacturing.

SUMMARY OF THE INVENTION

Electrical energy storage device are provided, as well as related methods. In some embodiments, the electrical energy storage device comprises a first electrode comprising a polymer comprising a substituted or unsubstituted polyacetylene; a second electrode in electrochemical communication with the first electrode; a porous separator material arranged between the first and second electrodes; and an electrolyte in electrochemical communication with the first and second electrodes.

Methods for fabricating an electrical energy storage device are also provided. The method may comprise forming a conductive material comprising a polymer comprising a substituted or unsubstituted polyacetylene on the surface of a substrate.

Methods for storing electrical energy are also provided. The method may comprise applying an electric field to a device comprising a polymer comprising a substituted or unsubstituted polyacetylene.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

Embodiments described herein relate to compositions, devices, and methods for storage of energy (e.g., electrical energy). In some cases, devices including relatively inexpensive and readily available conductive materials such as polyacetylene-containing polymers are described.

In some embodiments, devices for energy storage are provided. For example, the device may be an electrochemical double-layer capacitor, also known as a supercapacitor, supercondenser, electrochemical double-layer capacitor, or ultracapacitor. Typically, the device may store energy (e.g., electric energy) in an electric field that is established by charge separation at an interface between two electroactive materials (e.g., electrode and electrolyte). A general embodiment of an energy storage device can include a first electrode, a second electrode in electrochemical communication with the first electrode, and a separator material (e.g., a porous separator material) arranged between the first and second electrodes. In some embodiments, the first electrode is a cathode and the second electrode is an anode. In some embodiments, the first electrode is an anode and the second electrode is a cathode. The device includes an electrolyte or other mobile phase that can dissociate into anions and cations in contact with both electrodes. The components of the device may be assembled such that the electrolyte is arranged between the first and second electrodes.

Figure 1A:
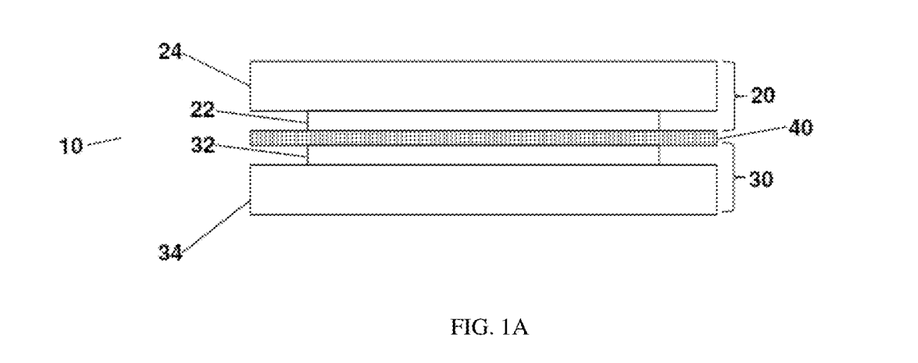
FIG. 1A shows a schematic representation of an energy storage device.

FIG. 1A shows an illustrative embodiment of a device as described herein. In the embodiment shown, single-cell device 10 includes a first electrode 20, which includes a conductive material 22 in contact with a substrate 24. A separator material 40 can be formed adjacent to electrode 20. A second electrode 30 may be arranged in electrochemical communication with the first electrode. For example, as shown in FIG. 1, electrode 30 includes a conductive material 32 in contact with a substrate 34, conductive material 32 being in contact with a surface of separator material 40 that is opposed to the surface of the separator material that is in contact with conductive material 22. An electrolyte may be arranged in contact with both electrode 20 and electrode 30.

Figure 1B:
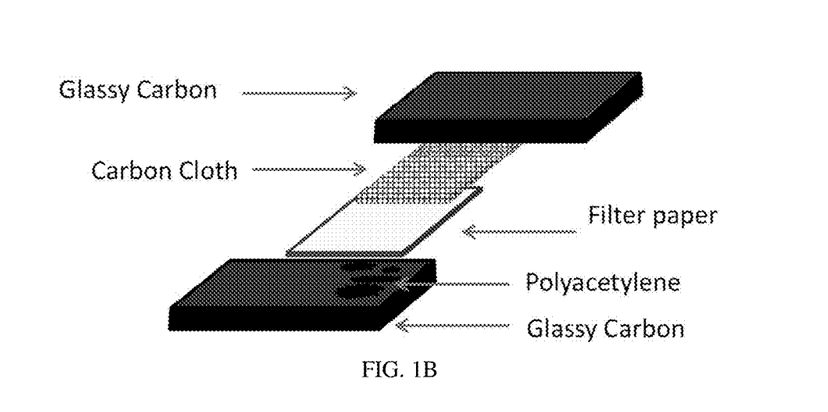
FIG. 1B shows another schematic representation of an energy storage device.
Figure 2:
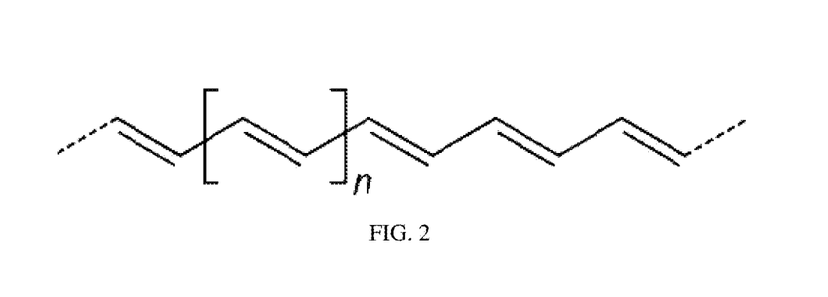
FIG. 2 shows the chemical structure of an exemplary unsubstituted polyacetylene.
Figure 7:
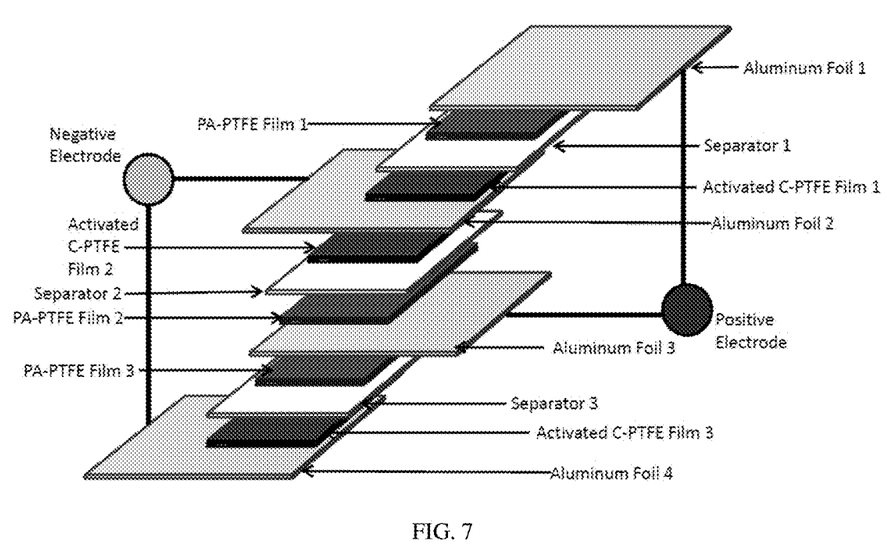
FIG. 7 shows a schematic representation of a multi-cell supercapacitor with three cells connected in parallel (e.g., a triple stack) with polyacetylene as a positive electrode.

In some cases, the device may be a single-cell device. That is, the device may include two conductive materials, each formed on different substrates and each conductive material arranged on an opposing side of a separator material, as shown in FIGS. 1A-B. In some cases, the device may be a multi-cell device, for example, as shown in FIG. 7. It should be understood that there are other embodiments in which the number and orientation of the components is varied. In some embodiments, one or more of the device components can be formed as thin films.

In one embodiment, the first and second electrodes may be placed on opposite surfaces of a substantially planar separator material wherein the thickness of the separator material determines the distance between the electrodes.

Some embodiments described herein involve the use of a polymer comprising a substituted or unsubstituted polyacetylene, as described more fully below. In some cases, the polymer may have a substituted or unsubstituted polyacetylene backbone. In some cases, the polymer may be a copolymer (e.g., random copolymer, block copolymer, etc.), a portion of which may have a substituted or unsubstituted polyacetylene backbone. In some cases, the substituted or unsubstituted polyacetylene polymer may be arranged in a device as an n-type material within a device. The term "n-type material" is given its ordinary meaning in the art and refers to a material that has more negative carriers (electrons) than positive carriers (holes). In some cases, the substituted or unsubstituted polyacetylene polymer may be arranged in a device as a p-type material within a device. The term "p-type material" is given its ordinary meaning in the art and refers to a material that has more positive carriers (holes) than negative carriers (electrons). Those of ordinary skill in the art would be capable of selecting the particular polyacetylene polymer suitable for use in a particular application. In some embodiments, the polyacetylene polymer may be selected to include various electron-withdrawing groups. Examples of electron-withdrawing groups include, but are not limited to, fluoro, nitro, cyano, carbonyl groups, sulfonyl, haloaryl (e.g., fluorinated aryls), and haloalkyl (e.g., fluorinated alkyls). In some embodiments, the polyacetylene polymer may be selected to include various electron-donating groups. Examples of electron-donating groups include, but are not limited to, alkyl, amino, methoxy, and the like.

In some cases, the first electrode includes the polymer comprising the substituted or unsubstituted polyacetylene. In some cases, the second electrode includes the polymer comprising the substituted or unsubstituted polyacetylene. In some cases, both the first and second electrodes include polymers comprising substituted or unsubstituted polyacetylenes. In some cases, the polymer may be a polyacetylene polymer substituted with carbon monoxide groups. The polymer may, in some cases, be arranged as a component of a composite material. For example, the composite material may include the polymer comprising the substituted or unsubstituted polyacetylene in combination with other components, such as carbon nanotubes, activated carbon, or a metal oxide.

In some embodiments, the first electrode includes a polymer comprising a substituted or unsubstituted polyacetylene. In some cases, the first electrode may include a composite material including the polyacetylene-containing polymer. The first electrode may include additional components, such as a charge collector material in physical contact with the polymer. For example, the polymer may be formed on the surface of a substrate comprising the charge collector material, i.e., the polymer may be formed on a conducting plate substrate. The charge collector material may be any material capable of facilitating the separation of charge within a double-layer capacitor. In some cases, the charge collector material includes a metal and/or a carbon-based material. Examples of charge collector materials include aluminum, polyacetylene, and glassy carbon.

In some embodiments, the second electrode may include a conductive material, including a carbon-based material or a conducting polymer. For example, the second electrode may include carbon, activated carbon, graphite, graphene, carbon nanotubes, and/or a conducting polymer such as polythiophene, polypyrrole, and the like. In some cases, the second electrode includes a polymer comprising a substituted or unsubstituted polyacetylene as the conductive material, or in addition to the conductive material. In some cases, the second electrode may include a composite material including the polyacetylene-containing polymer. The second electrode may include additional components, such as a charge collector material in physical contact with the conductive material. For example, the conductive material may be formed on the surface of a substrate comprising the charge collector material. In some cases, the charge collector material includes a metal, and/or a carbon-based material. Examples of charge collector materials include aluminum, polyacetylene, and glassy carbon.

Electrodes described herein, including electrodes which comprise polyacetylene-containing polymers, may include additional components that may improve the performance, stability and/or other properties of the polyacetylene-containing polymer or electrode. For example, the electrode may include a conductive material in powder form, and may further include a material that binds the powder particles together. Examples of other additives or modifiers include metal salts, metal oxides, polydimethylsiloxane, polystyrene, polypropylene, silicone oil, mineral oil, paraffin, a cellulosic polymer, polybutadiene, polyneopropene, natural rubber, polyimide, or other polymers.

In some cases, at least a portion of an electrode may be fabricated from a mixture containing the polymer comprising the substituted or unsubstituted polyacetylene and a fluid carrier. For example, the mixture may be used to form a film or layer containing the substituted or unsubstituted polyacetylene via a casting method, or other methods. The film or layer may be used as part of an active layer within an electrode. In some cases, the film or layer may be used as an active layer in the first electrode. In some cases, the film or layer may be used as an active layer in the second electrode. In some cases, the films or layers may have a thickness in the range of about 0.001 mm to about 100 mm, 0.01 mm to about 100 mm, 0.01 mm to about 10 mm, or, in some cases, about 0.01 mm to about 1 mm.

In some cases, the polyacetylene-containing polymer may be combined with one or more polymers having a different chemical structure, molecular weight, polymer length, polymer morphology, and/or other polymer characteristic relative to the polyacetylene-containing polymer. For example, a polymer blend which includes the polyacetylene-containing polymer may be utilized in devices described herein. In some cases, the polyacetylene-containing polymer may be combined with a conducting polymer. For example, the conducting polymer may be a derivative of polyaniline, polyphenylene, polyarylene, poly(bisthiophene phenylene), a ladder polymer, poly(arylene vinylene), or poly(arylene ethynylene), any of which is optionally substituted. In some embodiments, the conducting polymer is an optionally substituted polythiophene or a copolymer thereof with other conjugated aromatic or alkene units. In some embodiments, the conducting polymer is an optionally substituted polypyrrole or a copolymer thereof with other conjugated aromatic or alkene units.

The separator material (e.g., porous separator material) may be any material capable of physically separating the first and second electrodes, while also allowing fluids and/or charged species (e.g., electrolyte) to travel from one electrode to another. The separator material may also be selected to be chemically inert to other components of the device, so as to not interfere with device performance (e.g., charge/ discharge of the device). In some cases, the separator material is paper. In some cases, the separator material comprises a polymer. For example, the polymer may include polypropylene, polyethylene, cellulose, a polyarylether, or a fluoropolymer. In some cases, the separator material is a porous separator material.

Any component of the device, or portion thereof, may be porous or may have a sufficient number of pores or interstices such that the component, or portion thereof, is readily crossed or permeated by, for example, a fluid. In some cases, a porous material may improve the performance of the device by advantageously facilitating the diffusion of charged species to electroactive portions of the device. In some cases, a porous material may improve the performance of the device by increasing the surface area of an electroactive portion of the device. In some embodiments, a portion of an electrode may be modified to be porous. In some embodiments, at least a portion of the separator material may be selected to be porous.

The device may further include an electrolyte arranged to be in electrochemical communication with the first and second electrodes. The electrolyte can be any material capable of transporting either positively or negatively charged ions or both between two electrodes and should be chemically compatible with the electrodes. In some cases, the electrolyte is selected to be capable of supporting high charge stabilization. In some embodiments, the electrolyte comprises a liquid. In one set of embodiment, the electrolyte is an ionic liquid. Other examples of electrolytes include ethylene carbonate solutions or propylene carbonate solutions, either of which include at least one salt having the formula, $[(R)_4N^+][X^-]$, wherein X is $(PF_6)^-$, $(BF_4)^-$, $(SO_3R^a)^-$, $(R^aSO_2-N-SO_2R^a)^-$, $CF_3COO^-$, $(CF_3)_3CO^-$ or $(CF_3)_2CHO)^-$, wherein R is alkyl and $R^a$ is alkyl, aryl, fluorinated alkyl, or fluorinated aryl. In some embodiments the nitrogen of the ammonium ion may be part of a ring system. In another embodiment, the electrolyte may include a quaternary nitrogen species in which the nitrogen has an $sp^2$ electronic configuration, such as an imidazolium cation.

In some embodiments, the electrolyte may selected to be substantially free of metal-containing species (e.g., metals or metal ions), or may include less than about 1%, less than about 0.1%, less than about 0.01%, less than about 0.001%, or less than about 0.0001% of metals and/or metal ions, based on the total amount of electrolyte. In some embodiments, the electrolyte may be selected to be substantially free of lithium-containing species or lithium ion-containing species. In some embodiments, the electrolyte does not include metal-containing species.

Methods for storing electrical energy using any of the devices described herein are also provided. For example, the method may involve application of an electric field to a device as described herein. In some embodiments, the device may exhibit a specific capacitance of about 50 Farad/g, about 100 Farad/g, about 150 Farad/g, about 200 Farad/g (e.g., about 220 Farad/g), about 300 Farad/g, about 400 Farad/g, or, in some cases, about 500 Farad/g. For example, the device may exhibit a specific capacitance in the range of about 50 Farad/g to about 500 Farad/g, about 100 Farad/g to about 500 Farad/g, about 200 Farad/g to about 500 Farad/g, about 300 Farad/g to about 500 Farad/g, or about 400 Farad/g to about 500 Farad/g.

In some embodiments, the device may store about 50 kJ/kg, about 100 kJ/kg, about 200 kJ/kg, about 300 kJ/kg, about 400 kJ/kg, about 500 kJ/kg, about 600 kJ/kg, of electrical energy. In some cases, the device may store between about 50 kJ/kg and about 600 kJ/kg of electrical energy.

In some cases, the device is charged to about 1.5 V, about 2.0 V, about 2.5 V (e.g., about 2.7 V), about 3.0 V, or, about 3.5 V.

Devices and methods disclosed herein may capable of achieve relatively high specific energy density. In some embodiments, the device may achieve specific energy densities beyond those which are produced by devices limited by thermodynamic reduction/oxidation potentials, such as batteries (e.g., lithium-containing or lithium ion-containing batteries). Devices and methods disclosed herein can supply individual cell voltages that exceed the thermodynamic limits that would result in batteries made from the similar materials. In some embodiments, the device has a specific energy density of about 100 kJ/kg, about 200 kJ/kg, about 300 kJ/kg, about 400 kJ/kg, about 500 kJ/kg, or about 600 kJ/kg, based on the total weight of conductive material and, if present, polyacetylene-containing materials within the electrodes. For example, in embodiments where an electrode includes a composite material comprising a polymer comprising a substituted or unsubstituted polyacetylene and a conductive material, the specific energy density is based on the total weight of the conductive material and the polymer comprising the substituted or unsubstituted polyacetylene.

At least some of the devices disclosed herein provide an energy storage mechanism that includes both (1) electrostatic storage of electrical energy achieved by separation of charge in a Helmholtz double layer at the surface of a conductor electrode and an electrolytic solution electrolyte; and (2) electrochemical storage of electrical energy achieved by redox reactions on the surface of at least one of the electrodes or by specifically adsorbed ions that results in a reversible Faradaic charge-transfer on the electrode.

Methods for fabricating the devices described herein are also provided. The method may involve forming a conductive material that includes a polymer comprising a substituted or unsubstituted polyacetylene on the surface of a substrate, such as a charge collector substrate (e.g., conducting plate). The method may further involve arranging a separator material in contact with the conductive material. For example, a device may be fabricated by forming a first conductive material including a polyacetylene-containing polymer the surface of a first substrate, and arranging a first surface of a separator material in contact with the first conductive material. A second, conductive material may then be arranged in contact with a second, opposing side of the separator material, such that the first conductive material is in electrochemical communication with the second conductive material. The separator material may also be arranged to physically separate the first and second conductive materials. The method may further involve arranging an electrolyte in contact with the first and second electrodes. FIGS. 1A-B show illustrative embodiments of devices as described herein.

Conductive materials described herein may be formed on a substrate using various methods, including evaporation, direct polymerization, inkjet printing, casting methods including drop-casting and spin-casting, and the like. In some cases, the conductive material is in the form of a solid, which is then arranged/assembled on a substrate. For example, the conductive material (e.g., polyacetylene-containing polymer) may be in the form of a powder and arranged between the substrate and another device component (e.g., the porous separator material). In other cases, the conductive material is combined with a fluid carrier or solvent to form a solution, dispersion, or suspension, and the conductive material is formed on the substrate via a casting method (e.g., spin-casting, drop-casting, etc.) or by printing (e.g., inkjet printing). For example, a mixture comprising the polymer comprising the substituted or unsubstituted polyacetylene and a fluid carrier may be provided and then formed into a film. In some cases, films having a thickness in the range of about 0.01 mm to about 1 mm may be formed using such methods. In other cases, the polyacetylene-containing polymer is directly synthesized on the substrate. The conductive material may be treated by various methods to improve processability, physical and/or mechanical stability, and/or device performance. In some cases, the conductive material may be subjected to application of high pressure prior to formation on a substrate. For example, the conductive material (e.g., polyacetylene-containing polymer) may be in the form of a powder, which is then placed into a hydraulic press to form a pellet, film, or other shape. In some cases, the conductive material may be subjected to crosslinking conditions and/or solvent treatments.

As described herein, the device may include a polyacetylene-containing polymer. In some cases, the devices includes a substituted or an unsubstituted polyacetylene. In some cases, the devices includes a copolymer comprising polyacetylene. The polymer backbone may include cis double bonds, trans double bonds, or combinations thereof. In some embodiments, the polymer may include the structure, wherein:

$R^1$, $R^2$, $R^3$, and $R^4$ can be the same or different and each is H, alkyl, heteroalkyl, aryl, heteroaryl, heterocyclyl, halo, cyano, sulfonyl, sulfate, phosphonyl, phosphate, or carbonyl group (e.g., carboxylate, ketones such as alkylcarbonyl or arylcarbonyl, etc.), any of which is optionally substituted; and m and n are each greater than 1.

In some embodiments, $R^1$, $R^2$, $R^3$, and $R^4$ are each H. In some embodiments, at least one of $R^1$, $R^2$, $R^3$, and $R^4$ is halo (e.g., fluorine).

In some embodiments, the polymer has the structure, wherein m and n are greater than 1.

In some embodiments, the polymer has the structure, wherein:

$R^1$, $R^2$, $R^3$, and $R^4$ can be the same or different and each is H, alkyl, aryl, halo, cyano, sulfonyl, sulfate, phosphonyl, phosphate, or carbonyl group (e.g., carboxylate, ketones such as alkylcarbonyl or arylcarbonyl, etc.), any of which is optionally substituted; and m, m', n, and n' are each greater than 1.

In some embodiments, the polymer has the structure, wherein:

$R^1$, $R^2$, $R^3$, and $R^4$ can be the same or different and each is H, alkyl, aryl, halo, cyano, sulfonyl, sulfate, phosphonyl, phosphate, or carbonyl group (e.g., carboxylate, ketones such as alkylcarbonyl or arylcarbonyl, etc.), any of which is optionally substituted; and m, m', n, n', and o are each greater than 1.

In any of the embodiments disclosed herein, n, n', m, m' and o are the same or different and are an integer between 2 and 10,000, or between 10 and 10,000, or between 100 and 10,000, or between 100 and 1,000. The molecular weight of the polyacetylene-containing polymer may be between about 500 and about 1,000,000, or between about 500 and about 100,000, or between about 10,000 and about 100,000, or the like.

Methods described herein may involve the synthesis of polymers including a substituted or unsubstituted polyacetylene. In some cases, the polymers may be synthesized in the presence of a fluid carrier, such as toluene. For example, the polymer may be produced using cationic methods, metal catalyzed insertion reactions, or metal alkylidene reactions proceeding through metallocyclobutene intermediates (also known as a ring opening metathesis polymerization if the acetylene is considered to be a two-membered cyclic alkene), and the like. Typically, monomeric species, or a combination of monomeric species, are exposed to a catalyst or catalyst mixture under appropriate conditions in a reaction vessel to produce the polymer. In some cases, the monomeric species includes a carbon-carbon triple bond. In some cases, the monomeric species includes a carbon-carbon double bond. In some cases, the monomeric species includes a carbonyl or C=O group. The monomeric species may be in vapor phase or in solution phase, and may optionally be combined with a fluid carrier or solvent (e.g., organic solvent) in the reaction vessel. In an illustrative embodiment, acetylene gas may be introduced to the reaction vessel containing a catalyst or catalyst mixture. In some cases, the polymer may be synthesized in a gel form, i.e., swollen with solvent and/or other additives. In some cases, the polymer (e.g., polyacetylene) may be synthesized directly onto a substrate, e.g., as a film.

In some cases, the method involves polymerizing at least one monomeric species including a carbon-carbon triple bond to form a polyacetylene-containing polymer. The carbon-carbon triple bond may be unsubstituted (e.g., acetylene) or substituted with one or more substituents. In some cases, the monomeric species may be polymerized in the presence of additional monomers (e.g., to form a copolymer). Examples of additional monomeric species include carbon monoxide, carbon disulfide, and the like. In one set of embodiments, a monomeric species including a carbon-carbon triple bond and carbon monoxide are copolymerized to form a polymer including alpha, beta-unsaturated carbonyl moieties.

Those of ordinary skill in the art would be able to select a catalyst or catalyst mixture suitable for use in the synthesis of polymers described herein. The catalyst may be in solid form (e.g., particles), or combined with a solvent to form a solution, suspension, or dispersion. In some cases, the catalyst is a metal-containing catalyst or catalyst mixture. For example, the catalyst or catalyst mixture may include aluminum, titanium, tungsten, ruthenium, rhodium, molybdenum, or combinations thereof. In some cases, the catalyst may be a mixture including titanium and aluminum (e.g., Ziegler-Natta catalyst). In some embodiments, the catalyst or catalyst mixture may comprise ruthenium, rhodium, tungsten, or molybdenum. Examples of catalyst and catalyst mixtures include, but are not limited to, the Ziegler-Natta catalyst (e.g., prepare from, benzylidene-bis(tricyclohexyl-phosphine)dichloro-ruthenium (Grubbs' first generation catalyst), benzylidene[1,3-bis(2,4,6-trimethylphenyl)-2-imidazolidinylidene]dichloro(tricyclohexylphosphine)ruthenium (Grubbs' second generation catalyst), and Schrock catalysts (e.g., tris(t-butoxy)(2,2-dimethylpropylidyne)(VI) tungsten).

In some cases, the catalyst or catalyst mixture is in the form of particles. For example, the particles may be aerosol-generated catalyst particles.

In some cases, polymers as described here may be produced as highly crystalline polymers. In some cases, the polymers may form a solid state structure that is substantially fixed.

The polymerization step may be performed in the presence of additional components. For example, monomeric species may be polymerized in the presence of an additive, such that the additive is entrapped or dispersed throughout the resulting polymer material. Such additives may be selected to be electroactive materials (e.g., polymers) that can enhance performance of the device, e.g., enhance charging, discharging, and/or stabilization of a charged state.

In some cases, the additive may be a passive material that can be removed post-polymerization. For example, monomeric species may be polymerized in the presence of an additive, wherein at least some of the additive is removed post-polymerization to produce a porous polymer material. In some cases, the additive may be removed by treatment with heat. In some cases, the additive may be removed by treatment with a solvent.

For example, the polymerization may be performed in the presence of a phase-separating polymer that can be removed after polymerization to yield a porous material. Without wishing to be bound by any theory, since the capacitance of the device may be proportional to the surface area of the interface between an electrode and electrolyte, increasing the surface area of the interface can increase the amount of energy stored in the device.

Other examples of additives that may be used during polymerization include other polymers and/or modifiers, such as polydimethylsiloxane, polystyrene, polyethylene, polypropylene, silicone oil, mineral oil, paraffin, cellulosic polymers, polybutadiene, polyneopropene, natural rubber, or polyimide.

Those of ordinary skill in the art would be able to select a set of conditions appropriate for a particular polymerization reaction. For example, the conditions may be selected based on the chemical structure(s) of the monomeric species (e.g., selection of catalyst, solvents, etc.), the stability of the catalyst in the presence of air and/or water, and/or the compatibility (e.g., solubility) of various reaction components with one another. Exemplary methods for synthesizing polymers which include a substituted or unsubstituted polyacetylene are described in, for example, Liu et al., "Acetylenic Polymers: Syntheses, Structure, and Functions," Chem. Rev. 2009, 109, 5799; MacInnes et al., "Organic Batteries: Reversible n- and p-Type Electrochemical Doping of Polyacetylene, $(CH)_x$," J.C.S. Chem. Comm. 1981, 371; and Ito et al., "Simultaneous Polymerization and Formation of Polyacetylene Film on the Surface of Concentrated Soluble Ziegler-Type Catalyst Solution," J. Polymer Science 1974, 12, 11, the contents of which documents are incorporated herein by reference in their entirety for all purposes.

The polyacetylene-containing polymer may be treated before and/or after fabrication of the electrodes, or prior to, during, or after the polymerization step, to improve the performance, stability, and/or other property of the device. In some cases, the polymer may be treated to enhance the charge storage ability of the device. In some cases, the polymer may be treated to stabilize the polymer material. Such treatments may include treatment with dichloroketene ($Cl_2C=C=O$), aromatic diazonium salts ($Ar-N^{2+}$), disulfides (R—S—S—R), organic sulfur chlorides (RS—Cl), sulfur chlorides ($SCl_2$ and $S_2Cl_2$), metal salts and oxides including $MnO_2$ or $Mn(OAc)_2$, silicon hydrides (e.g., $R_nSH_4$ where R can be alkyl, aryl, vinyl, alkoxy, phenoxy, carboxylate and n=0-4) and disilanes, compounds having one or more silicon hydride group (e.g., SiH) including oligomers and cyclic compounds, polymers containing silicon hydrides such as copolymers with polydimethylsiloxane, phenols including sterically hindered phenols (e.g., butylated hydroxyl toluene (BHT) and derivatives thereof), and other radical scavengers. For example, the polymerization step may be performed in the presence of a stabilizing agent, such that that stabilizing agent is dispersed throughout the resulting polymer material.

Methods described herein may allow for simplified methods for manufacturing materials and devices including polyacetylene-containing polymers. In some embodiments, a continuous method for the formation of the polyacetylene-containing particles, films, or other materials may be provided. The continuous process may involve polymerization of a monomer dissolved in a condensed phase (e.g., solution phase) or direct polymerization of a vapor-phase monomer.

For example, the method may involve continuously moving a plurality of substrates through various reaction zones to form a polyacetylene-containing material. In some cases, a substrate may be passed through a first reaction zone, wherein a catalyst material (e.g., catalyst particles) may be formed on the substrate. The substrate containing the catalyst material may then pass through a second reaction zone containing a monomeric species (e.g., acetylene gas), wherein polymerization takes place at the surface of the substrate on the catalyst material. Such methods may allow for the production of large quantities of polyacetylene-containing materials and/or formation of polyacetylene-containing materials on relatively large surface areas.

The substrate can be any material capable of supporting an electrode and electrolyte, as described herein. The substrate may be selected to have a thermal coefficient of expansion similar to those of the other components of the device to promote adhesion and prevent separation of the components at various temperatures. In some cases, the substrate may include materials capable of facilitating the separation of charge within, for example, a double-layer capacitor, i.e., the substrate may function as a charge collector. Examples of substrates include metal (e.g., aluminum) or metal-containing substrates, polymer substrates, and carbon-based (e.g., carbon, glassy carbon, activated carbon, graphene, graphite, carbon nanotubes, etc.) substrates. The dimensions of the substrate may be any length, width, and thickness that is desired for a particular end use and may be square, rectangular, circular, or otherwise shaped.

Various fluid carriers or solvents may be suitable for use in embodiments described herein. In some cases, the fluid carrier may be an organic solvent. In some cases, the fluid carrier may be an aqueous solvent. Examples of fluid carriers and solvents include, but are not limited to, water, chloroform, carbon dioxide, toluene, benzene, hexane, dichloromethane, tetrahydrofuran, ethanol, acetone, or acetonitrile.

The term "polymers," as used herein, is given its ordinary meaning in the art and refers to extended molecular structures comprising a backbone (e.g., non-conjugated backbone, conjugated backbone) which optionally contain pendant side groups, where "backbone" refers to the longest continuous bond pathway of the polymer. Polymers may also include oligomers. In some embodiments, the polymer comprises a non-conjugated polymer backbone. In some embodiments, at least a portion of the polymer is conjugated, i.e. the polymer has at least one portion along which electron density or electronic charge can be conducted, where the electronic charge is referred to as being "delocalized." In some cases, the polymer is a pi-conjugated polymer, where p-orbitals participating in conjugation can have sufficient overlap with adjacent conjugated p-orbitals. In some cases, the polymer is a sigma-conjugated polymer. In one embodiment, at least a portion of the backbone is conjugated. In one embodiment, the entire backbone is conjugated and the polymer is referred to as a "conjugated polymer." Polymers having a conjugated pi-backbone capable of conducting electronic charge may also be referred to as "conducting polymers." In some cases, the conjugated pi-backbone may be defined by a plane of atoms directly participating in the conjugation, wherein the plane arises from a preferred arrangement of the p-orbitals to maximize p-orbital overlap, thus maximizing conjugation and electronic conduction.

As used herein, the term "alkyl" refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. In some embodiments, a straight chain or branched chain alkyl may have 30 or fewer carbon atoms in its backbone, and, in some cases, 20 or fewer. In some embodiments, a straight chain or branched chain alkyl has 12 or fewer carbon atoms in its backbone (e.g., $C_1$-$C_{12}$ for straight chain, $C_3$-$C_{12}$ for branched chain), or, in some cases, 6 or fewer, or 4 or fewer. Likewise, some cycloalkyls have from 3-10 carbon atoms in their ring structure, or have 5, 6 or 7 carbons in the ring structure. Examples of alkyl groups include, but are not limited to, methyl, ethyl, propyl, isopropyl, cyclopropyl, butyl, isobutyl, tert-butyl, cyclobutyl, hexyl, cyclohexyl, and the like.

The term "heteroalkyl" refers to an alkyl group as described herein in which one or more carbon atoms is replaced by a heteroatom. Suitable heteroatoms include oxygen, sulfur, nitrogen, phosphorus, and the like. Examples of heteroalkyl groups include, but are not limited to, alkoxy, amino, thioester, and the like.

The term "aryl" refers to aromatic carbocyclic groups, optionally substituted, having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl). That is, at least one ring may have a conjugated pi electron system, while other, adjoining rings can be cycloalkyls, cycloalkenyls, cycloalkynyls, aryls and/or heterocyclyls. The aryl group may be optionally substituted, as described herein. "Carbocyclic aryl groups" refer to aryl groups wherein the ring atoms on the aromatic ring are carbon atoms. Carbocyclic aryl groups include monocyclic carbocyclic aryl groups and polycyclic or fused compounds (e.g., two or more adjacent ring atoms are common to two adjoining rings) such as naphthyl groups.

The term "heteroaryl" refers to aryl groups comprising at least one heteroatom as a ring atom.

The term "heterocyclyl" refers to refer to cyclic groups containing at least one heteroatom as a ring atom, in some cases, 1 to 3 heteroatoms as ring atoms, with the remainder of the ring atoms being carbon atoms. Suitable heteroatoms include oxygen, sulfur, nitrogen, phosphorus, and the like. In some cases, the heterocycle may be 3- to 10-membered ring structures, or in some cases 3- to 7-membered rings, whose ring structures include one to four heteroatoms. The term "heterocycle" may include heteroaryl groups (e.g., aromatic heterocycles), saturated heterocycles (e.g., cycloheteroalkyl) groups, or combinations thereof. The heterocycle may be a saturated molecule, or may comprise one or more double bonds. In some case, the heterocycle is an aromatic heterocycle, such as pyrrole, pyridine, and the like. In some cases, the heterocycle may be attached to, or fused to, additional rings to form a polycyclic group. In some cases, the heterocycle may be part of a macrocycle. The heterocycle may also be fused to a spirocyclic group. In some cases, the heterocycle may be attached to a compound via a nitrogen or a carbon atom in the ring.

Heterocycles include, for example, thiophene, benzothiophene, thianthrene, furan, tetrahydrofuran, pyran, isobenzofuran, chromene, xanthene, phenoxathiin, pyrrole, dihydropyrrole, pyrrolidine, imidazole, pyrazole, pyrazine, isothiazole, isoxazole, pyridine, pyrazine, pyrimidine, pyridazine, indolizine, isoindole, indole, indazole, purine, quinolizine, isoquinoline, quinoline, phthalazine, naphthyridine, quinoxaline, quinazoline, cinnoline, pteridine, carbazole, carboline, triazole, tetrazole, oxazole, isoxazole, thiazole, isothiazole, phenanthridine, acridine, pyrimidine, phenanthroline, phenazine, phenarsazine, phenothiazine, furazan, phenoxazine, pyrrolidine, oxolane, thiolane, oxazole, oxazine, piperidine, homopiperidine (hexamnethyleneimine), piperazine (e.g., N-methyl piperazine), morpholine, lactones, lactams such as azetidinones and pyrrolidinones, sultams, sultones, other saturated and/or unsaturated derivatives thereof, and the like. The heterocyclic ring can be optionally substituted at one or more positions with such substituents as described herein. In some cases, the heterocycle may be bonded to a compound via a heteroatom ring atom (e.g., nitrogen). In some cases, the heterocycle may be bonded to a compound via a carbon ring atom. In some cases, the heterocycle is pyridine, imidazole, pyrazine, pyrimidine, pyridazine, acridine, acridin-9-amine, bipyridine, naphthyridine, quinoline, benzoquinoline, benzoisoquinoline, phenanthridine-1,9-diamine, or the like.

As used herein, the term "halo" designates —F, —Cl, —Br, or —I.

The terms "carboxyl group," "carbonyl group," and "acyl group" are recognized in the art and can include such moieties as can be represented by the general formula:

wherein W is H, OH, O-alkyl, O-alkenyl, or a salt thereof. Where W is O-alkyl, the formula represents an "ester." Where W is OH, the formula represents a "carboxylic acid." The term "carboxylate" refers to an anionic carboxyl group. In general, where the oxygen atom of the above formula is replaced by sulfur, the formula represents a "thiolcarbonyl" group. Where W is a S-alkyl, the formula represents a "thiolester." Where W is SH, the formula represents a "thiolcarboxylic acid." On the other hand, where W is alkyl or aryl, the above formula represents a "ketone" group (e.g., alkylcarbonyl, arylcarbonyl, etc.). Where W is hydrogen, the above formula represents an "aldehyde" group.

Any of the above groups may be optionally substituted. As used herein, the term "substituted" is contemplated to include all permissible substituents of organic compounds, "permissible" being in the context of the chemical rules of valence known to those of ordinary skill in the art. It will be understood that "substituted" also includes that the substitution results in a stable compound, e.g., which does not spontaneously undergo transformation such as by rearrangement, cyclization, elimination, etc. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and cannot be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms.

Examples of substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —$CF_3$, —CN, aryl, aryloxy, perhaloalkoxy, aralkoxy, heteroaryl, heteroaryloxy, heteroarylalkyl, heteroaralkoxy, azido, amino, halide, alkylthio, oxo, acylalkyl, carboxy esters, -carboxamido, acyloxy, aminoalkyl, alkylaminoaryl, alkylaryl, alkylaminoalkyl, alkoxyaryl, arylamino, aralkylamino, alkylsulfonyl, -carboxamidoalkylaryl, -carboxamidoaryl, hydroxyalkyl, haloalkyl, alkylaminoalkylcarboxy-, aminocarboxamidoalkyl-, cyano, alkoxyalkyl, perhaloalkyl, arylalkyloxyalkyl, and the like.

EXAMPLES AND EMBODIMENTS

Example 1

The following example describes the preparation of a polyacetylene polymer. To a 100 mL Schlenk flask purged with dry nitrogen was added dry toluene (30 mL), followed by tetrabutoxytitanium (5.2 g, 15 mmol). Triethylaluminum solution in toluene (31 mL, 1.9 M, 60 mmoL) was slowly added, and the resulting mixture was stirred for 4 h at room temperature to form the catalyst solution, which was stored under nitrogen.

In a separate flask was added dry toluene (40 mL) and small amount of the catalyst solution (0.6 mL). Acetylene gas, which was purified by passing through a dry ice trap, was introduced via a syringe needle. The polymerization was allowed to continue for 16 h. The polymer was suspended in isopropanol, and the precipitates were collected by filtration, washed with isopropanol, and dried under vacuum to yield polyacetylene (3.4 g).

Example 2

In the following example, a supercapacitor device was assembled according to FIG. 1B. The negative electrode was Spectracarb Activated Carbon Fabric Type 2225 from Engineered Fibers Technology, LLC. In a representative experiment, polyacetylene (5.9 mg) was ground into fine particles and evenly spread on the surface of half of the 2.5×2.5 $cm^2$ glassy carbon, and the polyacetylene was then completely covered with a piece of filter paper (Whatman #6). On top of the filter paper was placed the carbon cloth cut into rectangular shape, just enough to cover the polyacetylene area (the weight of the carbon cloth was 50 mg). On top of the carbon cloth was placed another 2.5×2.5 $cm^2$ glassy carbon square. The completed assembly was then clamped together with bind clips, and electrolyte (prepared by mixing tetraethyammonium hexafluorophosphate, propylene carbonate, and ethylene carbonate in a weight ratio of 2:1:1) was then added through the edge of the device.

Example 3

Figure 3:
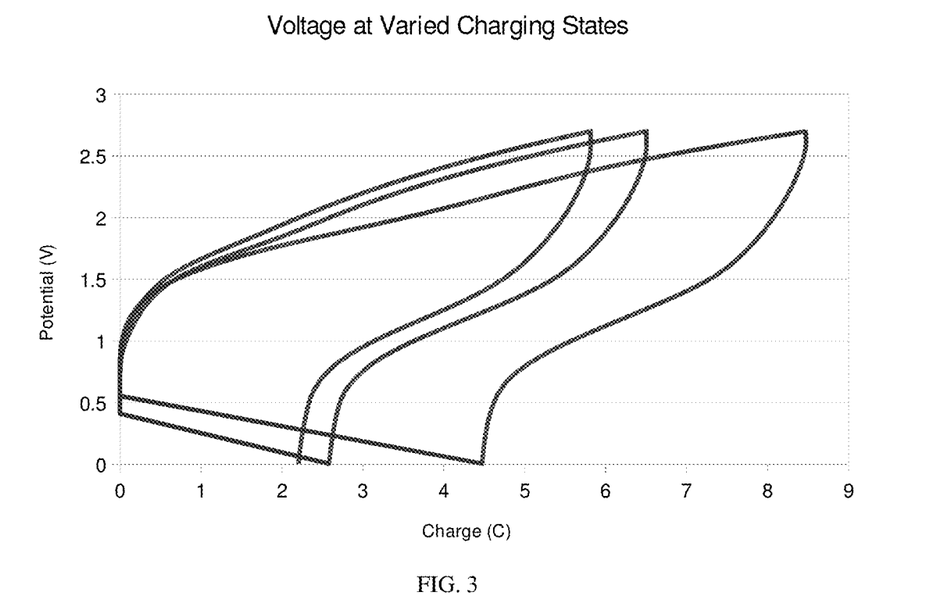
FIG. 3 shows a graph of the voltage of a device including polyacetylene at various charging states.
Figure 4:
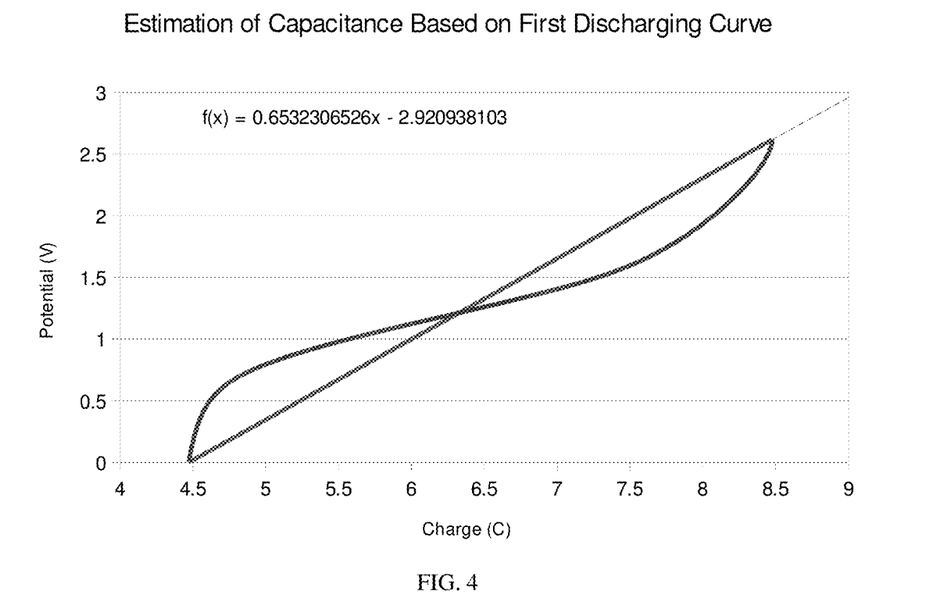
FIG. 4 shows a graph of the estimated capacitance of a device including polyacetylene on the first discharging curve.
Figure 5:
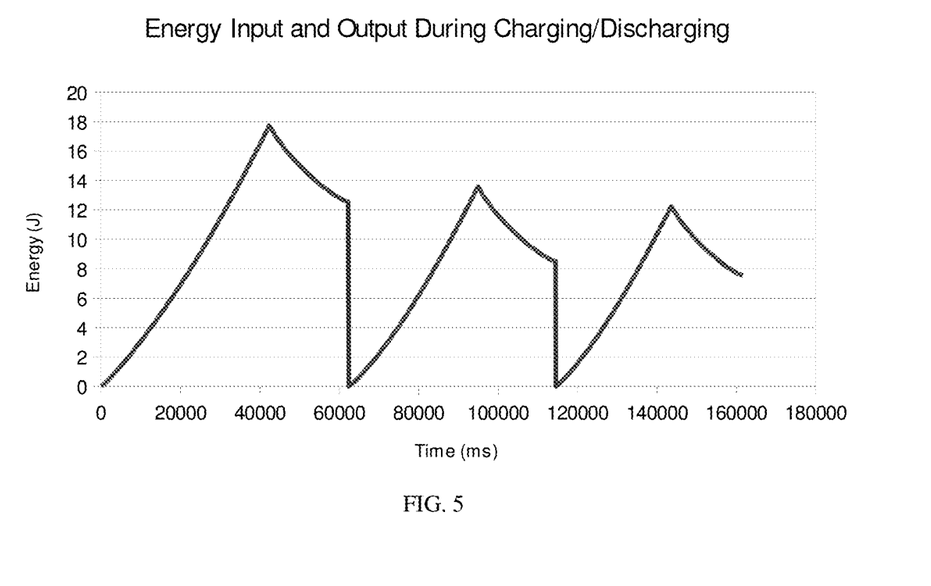
FIG. 5 shows a graph of the integrated energy input and output during charging/discharging of a device including polyacetylene.

The following example describes the performance of the supercapacitor device described in Example 2. The device was analyzed by charging at constant current (0.002 A) until the voltage reached 2.7 V, and then discharging at constant current (0.002 A) until the voltage reached 0. The device voltage was monitored continuously every microsecond during the charging discharging process. The charging/discharging process was repeated three times. FIG. 3 shows the voltage charging state relationship during the first three cycles. The capacitance of the device was estimated as 1.53 by calculating the reciprocal of the line passing the both ends of the curve. (FIG. 4) The specific capacitance based on polyacetylene was calculated to be 259 kF/kg. The specific energy based on polyacetylene was calculated by integrate the energy released during the first discharging (FIG. 5, the total energy released during the first discharging was 5.2 J) and dividing the total by the mass of the polyacetylene. The calculated specific energy density was 882 kJ/kg.

Example 4

In the following example, various electrode materials were prepared.

In one exemplary procedure, polyacetylene films were prepared using a binder such as polytetrafluoroethylene (PTFE). In a representative procedure, polyacetylene (1 g) was ground into fine powder and mixed with polytetrafluoroethylene (PTFE, 60% suspension in water, 0.167 g), and further diluted with water (2 g). The resulting dough-like material was rolled into 200 micron film on a rolling mill. The resulting film was then dried under vacuum and cut into desirable sizes to be used as positive electrodes in supercapacitor devices.

In another exemplary procedure, polyacetylene films using hydraulic press, without addition of any binders. In a representative procedure, polyacetylene (4 g) was ground into fine powder, and was evenly loaded onto a 5×5 cm$^2$ square shaped press die. 12 Tons of force was applied to result in a 5×5 cm$^2$ polyacetylene film, which was then cut into desirable sizes to be used as electrodes in supercapacitor devices.

In another exemplary procedure, activated carbon films were prepared using polytetrafluoroethylene (PTFE) as binder. In a representative procedure, activated carbon (2.0 g) was mixed with polytetrafluoroethylene (PTFE, 60% suspension in water, 0.5 g) and water (4.5 mL). The resulting mixture was kneaded into a dough-like material and rolled into 200 micron film on a rolling mill. The film was then cut into desirable sizes to be used as electrodes in supercapacitor devices.

Example 5

In the following example, single-cell capacitors were prepared using polyacetylene films as positive electrodes. The films were prepared with a polytetrafluoroethylene (PTFE) binder, according to the procedure described in Example 4.

Figure 6:
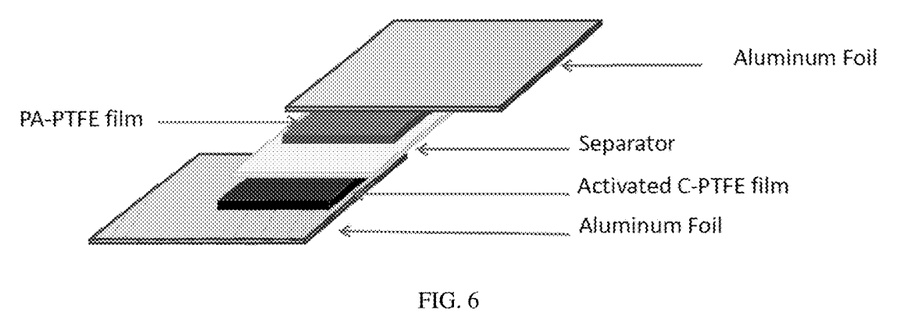
FIG. 6 shows a schematic representation of a single-cell supercapacitor with polyacetylene as a positive electrode.

A polyacetylene film (168.2 mg), activated carbon film (213.4 mg), and cellulose separator, all saturated with electrolyte (1-Ethyl-3-methylimidazolium tetrafluoroborate), were assembled with aluminum foil as shown in FIG. 6. The interfaces between aluminum foil/polyacetylene film and aluminum foil/activated carbon film were dusted with activated carbon powder (6.9 mg and 5.1 mg respectively) to enhance conductivity. The completed assembly was then pressed between two glass slides held together by binder clip.

The performance of this device was tested by passing a constant current into polyacetylene film from the activated carbon film, until the potential difference between the two electrodes reached 3.5 V, and then the direction of the current was reversed. The energy density of the completed device based on energy released during first cycle was 65 kJ/kg (245 kJ/kg based on the total weight of carbon and polyacetylene materials on the electrodes).

Example 6

In the following example, single-cell capacitors were prepared using pressed polyacetylene films as positive electrodes. The films were prepared with a polytetrafluoroethylene (PTFE) binder, according to the procedure described in Example 4. A polytetrafluoroethylene film, binder (198.0 mg), activated carbon film (217.5 mg), and cellulose separator, all saturated with electrolyte (1-ethyl-3-methylimidazolium tetrafluoroborate), were assembled with aluminum foil according to FIG. 6. The interfaces between aluminum foil/polyacetylene film and aluminum foil/activated carbon film were dusted with activated carbon powder (10.3 mg and 10.2 mg respectively) to enhance conductivity. The completed assembly was then pressed between two glass slides held together by binder clip.

The performance of this device was tested by passing a constant current into polyacetylene film from the activated carbon film, until the potential difference between the two electrodes reached 3.5 V, and then the direction of the current was reversed. The energy density of the completed device based on energy released during first cycle was 81 kJ/kg (256 kJ/kg based on the total weight of carbon and polyacetylene materials on the electrodes).

Example 7

In the following example, multi-cell capacitors were prepared using polyacetylene films as positive electrodes. Three polyacetylene films (220.2 mg, 227.3 mg, and 216.8 mg), three activated carbon films (219.9 mg, 249.5 mg, 297.4 mg), and cellulose separators, all saturated with electrolyte (1-ethyl-3-methylimidazolium tetrafluoroborate), were assembled with aluminum foils according to FIG. 7. The interfaces between aluminum foil/polyacetylene film and aluminum foil/activated carbon film were dusted with activated carbon powder (9.9-11.2 mg) to enhance conductivity. The completed assembly was then pressed between two glass slides held together by binder clip.

The performance of this device was tested by passing a constant current into polyacetylene film from the activated carbon film, until the potential difference between the two electrodes reached 3.5 V, and then the direction of the current was reversed. The energy density of the completed device based on energy released during first cycle was 60 kJ/kg (242 kJ/kg based on the total weight of carbon and polyacetylene materials on the electrodes).

Having thus described several aspects of some embodiments, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed:

1. A method for fabricating a capacitor, said method comprising:
   Producing a substituted or unsubstituted polyacetylene;
   rolling or pressing the polyacetylene to form a polyacetylene film;
   using the polyacetylene film to make a positive electrode of the capacitor;
   providing a negative electrode of the capacitor that is in electrochemical communication with the positive electrode; and
   adding an electrolyte that is substantially free of a metal-containing species between the positive and negative electrodes.

2. A method as in claim 1, wherein producing the polyacetylene comprises polymerizing one or more monomeric species.

3. A method as in claim 2, wherein polymerizing the monomeric species is done in the presence of fluid carrier.

4. A method as in claim 2, wherein polymerizing the monomeric species is done in the presence of an additive.

5. A method as in claim 4, wherein the additive is dispersed throughout the resulting polyactetylene.

6. A method as in claim 4, further comprising removing at least some of the additive post-polymerization to produce a porous polyactetylene.

7. A method as in claim 6, wherein removing the additive involves treating with heat or treating with solvent.

8. A method as in claim 2, wherein polymerizing the monomeric species is done in the presence of a phase-separating polymer, and the phase-separating polymer is removed after polymerization to provide a porous polyactetylene.

9. A method as in claim 2, wherein polymerizing the monomeric species is done in the presence of catalyst particles.

10. A method as in claim 9, wherein the catalyst particles are aerosol-generated catalyst particles.

11. A method as in claim 2, wherein polymerizing is a continuous process involving either a monomer dissolved in a condensed phase or direct reaction of vapor-phase monomer.

12. The method of claim 1, wherein producing the polyacetylene comprises grinding the substituted or unsubstituted polyacetylene into a powder and wherein rolling or pressing the polyactetylene involves rolling or pressing the powder to form the film.

13. The method of claim 12, wherein using the polyacetylene film to make the positive electrode further comprises cutting the polyacetylene film into a desired size.

14. The method of claim 12, wherein using the polyacetylene film to make the positive electrode further comprises loading the powder into a die.

15. The method of claim 14, wherein using the polyacetylene film to make the positive electrode comprises pressing the powder in the die to form the polyacetylene film.

16. The method of claim 15, wherein using the polyacetylene film to make the positive electrode comprises using a hydraulic press to press the powder in the die to form the polyacetylene film.

17. The method of claim 12, wherein producing the polyacetylene further comprises mixing the powder in a fluid carrier to form a dough-like material.

18. The method of claim 17, wherein the fluid carrier comprises PTFE.

19. The method of claim 17, wherein the fluid carrier comprises PTFE and water.

20. The method of claim 17, wherein using the polyacetylene film to make the positive electrode comprises rolling the dough-like material to form the polyacetylene film.

21. The method of claim 12, wherein producing the polyacetylene comprises mixing the powder in a fluid carrier along with a binder to form a dough-like material.

22. The method of claim 21, wherein using the polyacetylene film to make the positive electrode comprises rolling the dough-like material to form the film.

23. The method of claim 12, wherein producing the polyacetylene comprises polymerizing acetylene in a solvent.

24. The method of claim 23, wherein producing the polyacetylene further comprises suspending the polymerized acetylene in a liquid.

25. The method of claim 24, wherein producing the polyacetylene further comprises filtering the polymerized acetylene out of the liquid.

26. The method of claim 12, wherein providing the negative electrode of the capacitor that is in electrochemical communication with the positive electrode comprises adding an electrolyte between the positive and negative electrodes.

27. The method of claim 26, wherein the electrolyte is in liquid form.

28. The method of claim 1, wherein using the polyacetylene film to make the positive electrode of the capacitor involves using the polyacetylene film as an active layer of the positive electrode.

29. The method of claim 1, wherein the capacitor is an electrochemical double-layer capacitor.

30. The method of claim 26, wherein the electrolyte comprises a liquid.

31. The method of claim 12, wherein the electrolyte is substantially free of lithium-containing species or lithium ion-containing species.

* * * * *